(12) United States Patent
Wei

(10) Patent No.: US 7,356,671 B1
(45) Date of Patent: Apr. 8, 2008

(54) SOC ARCHITECTURE FOR VOICE AND VIDEO OVER DATA NETWORK APPLICATIONS

(75) Inventor: David Dawei Wei, Fremont, CA (US)

(73) Assignee: Vbridge MicroSystem, Inc., San Jose, CA (US)

( * ) Notice: Subject to any disclaimer, the term of this patent is extended or adjusted under 35 U.S.C. 154(b) by 38 days.

(21) Appl. No.: 11/460,560

(22) Filed: Jul. 27, 2006

(51) Int. Cl.
*G06F 3/00* (2006.01)
(52) U.S. Cl. ........................................................ 712/35
(58) Field of Classification Search .................. 712/35, 712/32, 36, 38; 725/143, 149
See application file for complete search history.

(56) References Cited

U.S. PATENT DOCUMENTS

| | | | | |
|---|---|---|---|---|
| 5,437,042 | A * | 7/1995 | Culley et al. ................. | 710/28 |
| 5,977,997 | A * | 11/1999 | Vainsencher ................ | 345/519 |
| 6,925,641 | B1 * | 8/2005 | Elabd .......................... | 718/101 |
| 2002/0141585 | A1 * | 10/2002 | Carr ............................ | 380/255 |
| 2003/0046510 | A1 * | 3/2003 | North .......................... | 711/203 |
| 2003/0120877 | A1 * | 6/2003 | Jahnke ........................ | 711/150 |
| 2005/0021871 | A1 * | 1/2005 | Georgiou et al. ........... | 709/250 |
| 2006/0007961 | A1 * | 1/2006 | Gray et al. .................. | 370/519 |
| 2006/0029051 | A1 * | 2/2006 | Harris et al. ................ | 370/356 |
| 2006/0057960 | A1 * | 3/2006 | Tran ........................... | 455/41.2 |

* cited by examiner

*Primary Examiner*—Eric Coleman
(74) *Attorney, Agent, or Firm*—Roger Chu

(57) ABSTRACT

A system-on-chip (SoC) for voice and video over data network applications includes a first and a second general purpose processors and a plurality of coprocessors. The coprocessors include: a VCODEC engine for video compression/decompression, a security engine for data encryption/decryption, a network processor for processing data packets, a video scaling controller for scaling up/down video frames, and digital signal coprocessors for signal processing and audio codec. An on-chip shared memory (e.g., SRAM) is coupled to the processors and some of the coprocessors. The SoC also includes: i) a stream controller for controlling various properties of a stream buffer in the shared memory according to a user defined context; ii) a transaction management engine for managing data especially stream transactions in accordance with one or more task queues created by the processors; and iii) a bi-directional stream bus coupled to the shared memory and a plurality of peripheral controllers.

24 Claims, 6 Drawing Sheets

| | |
|---|---|
| Processor #1 cache | 201 |
| Processor #2 cache | 202 |
| Processor Scratch Memory | 203 |
| VSC Line Buffer | 204 |
| Network Proc. Icache | 206 |
| Network Proc. TBLcache | 208 |
| Security Engine Buffer | 210 |
| DSP-COP Loop Buffer | 212 |
| Stream Buffers | 214 |

| Word # | Name | Bits | Descriptions |
|---|---|---|---|
| 0 | SA [26:0] | 26:0 | Source address for the transfer. Meaning of the source address is defined by SA mode bits.<br>Note transfer can be from or to the source address depending on 'Direction' bit. |
| 0 | SA Mode[1:0] | 28:27 | This field defines how the final transfer source address is generated from SA<br>0 – it's a queue with qID at SA[14:8] where SA[14]=1 is for SDRAM queue (QID=SA[13:8]) and SA[14]=0 is for stream (SID=SA[12:8])<br>1 – it's a SDRAM direct address where SA[26]=1 specifies a register address (SA[19:0]) and SA[26]=0 specifies a SDRAM address (SA[25:0])<br>2 – it's a freeq pointer with freeqID specified by freeqID<br>3 – it's a pointer pointed by CBUS address specified by SA[19:0] |
| 0 | Mode[1:0] | 30:29 | 0 – Indirect TME task. Setup a transaction for streamID<br>1 – Immediate data task. Data is in the following task. This mode is only for write to source address.<br>2 – Direct task. Target is set to stream using streamID<br>3 – Extended task. Target is set to target address in the next 8 bytes. |
| 0 | Direction | 31 | 1 – data from source address -> destination<br>0 – data from destination -> source |

| Word # | Name | Bits | Descriptions |
|---|---|---|---|
| 1 | Transfer Length[12:0] | 12:0 | Byte length. If data is immediate (Mode=1) transfer length should be <=8 |
| 1 | resultqID[2:0] | 15:13 | Post processing result ID. For indirect write (to SDRAM), transfer length to be pushed is from the last word of the write stream.<br>7 – disable result queue push<br>0-6 – push to result queue with the QID = result_qbase + resultqID. Please note the result queue can be a stream (QID[6]=0) or a SDRAM queue (QID[6]=1) |
| 1 | freeqID[1:0] | 17:16 | The freeq ID = free_qbase + freeqID. Please note the free queue can be a stream (QID[6]=0) or a SDRAM queue (QID[6]=1) |
| 1 | streamID[4:0] | 22:18 | Use by Mode 0 and 2 |
| 1 | statusID[4:0] | 27:23 | Specify one of the 32 status bits to be updated after the task is done |
| 1 | Freeq_release | 28 | 1 – release the SA[26:0] to free queue specified by freeqID<br>0 – do not release the pointer to free queue.<br>Please note the released pointer is the original SA data in the task. If SA mode is indirect (mode2 or mode3), pointer release is not recommended and will not be tested. |
| 1 | Skip_done | 29 | If 0, wait for the previous task to finish before post processing, i.e. result push and pointer release.<br>If 1, skip post processing of the task. Do not wait for the task to finish and proceed to next task. |

| Name | Bits | Descriptions |
|---|---|---|
| BUF_USE | 0 | 1 – this stream is for internal use,   0 – this stream is for SDRAM transaction |
| DB_SIZE | 1 | It specifies the word size on the DBUS.<br>0 – 1 byte. Only bit[7:0] is used,   1 – 4 bytes. bit[31:0] is used. |
| SIZE[2:0] | 4:2 | This specifies the buffer size. The buffer pointers needs to be aligned with the buffer size<br>000 – buffer size is 8 bytes,       001 – buffer size is 16 bytes<br>010 – buffer size is 32 bytes,      011 – buffer size is 64 bytes<br>100 – buffer size is 128 bytes,    101 – buffer size is 256 bytes<br>110 – buffer size is 512 bytes,    111 – reserved |
| Reserved | 6:5 | |
| MB_SIZE[1:0] | 8:7 | It specifies the burst length to trigger request to memory.<br>0 – 4 bytes, 1 – 8 bytes, 2 – 16 bytes, 3 – 32 bytes.<br>Note for write to SDRAM, the 'DB_LAST' signal also triggers the request to memory.<br>For video scaling streams, the minimum burst size is 8 bytes |
| SWAP[1:0] | 10:9 | This bit controls the swap of data on the DBUS side. On MC side it's always little endian. Assuming DBUS side has data bytes (3,2,1,0) in one transfer or (0), (1), (2), (3) in 4 transfers the data stored in the stream FIFO is like follows<br>00 – No swap. (3,2,1,0),           01 – 2-byte swap (2,3,0,1)<br>10 – 2-word swap (1,0,3,2),      11 – 4-byte swap (0,1,2,3) |
| RPTR[8:0] | 19:11 | Read pointer. Depending on buffer size only bits [N-1:0] is used where N represent log₂ of buffer size.<br>For buffer size that is less than 512 bytes, buffer read address = {BASE[2:0], WPTR[8:N], RPTR[N-1:0]}. Otherwise buffer read address = {BASE[2:0], RPTR[8:0]}. |
| BASE[2:0] | 22:20 | BASE address representing the 4K bytes buffer address [11:9] |
| WPTR[8:0] | 31:23 | Write pointer. Write address = {BASE[2:0], WPTR[8:0]} to support maximum 512 bytes |

502    504    506

SOC ARCHITECTURE FOR VOICE AND VIDEO OVER DATA NETWORK APPLICATIONS

BACKGROUND

1. Field

The present invention generally relates to the field of integrated circuit package such as system-on-chip (SoC) and more particularly to a SoC architecture for voice and video over data network applications.

2. Description of the Related Art

The Internet is a rapidly growing communication network of interconnected computers and computer networks around the world. Together, these millions of connected computers form a vast repository of multimedia information that is readily accessible by any of the connected computers from anywhere at any time. This growth and the easy access have significantly enhanced the opportunity to use advanced information technology for both the public and private sectors. It provides unprecedented opportunities for many technologies. End users may interact through their desktops, laptops, telephones, cell phones, hand held devices and videophones with one another. The internet has provided the means for accelerating the exchange of information as we progress through the information age.

In the telecommunication industry, the telephone calls are delivered through a circuit switching network traditionally. Nowadays, many telephone calls are delivered through the packet-switched network such as the Internet, which uses internet protocol (IP) networks to perform the traditional telecommunications connections. The packet-switched networks do not require any overhead to set up a connection. In addition, both audio and video, multimedia data, can be transmitted over the network as data stream made of packets encapsulated into frames. The applications of the telecommunication technologies on the Internet may include, but not be limited to, voice over IP (VoIP), video conference, videophone, IP television, and alike. However, there are a number of technical challenges for these multimedia data transmitted over the IP network. For example, multiple-channel real time voice/video traffic shares the same physical link (such as Ethernet) with normal high speed data traffic. The processing device at home or small business should possess both powerful real time media processing (e.g., voice/video compression and decompression) and packet processing (e.g., routing data packets) capabilities while it has to maintain a low cost level for consumer markets.

To overcome these technical challenges, a semiconductor chip capable of processing multimedia data encapsulated within network packets is placed in a video phone or the likes. Traditionally, such chip is a SoC using a digital signal processor (DSP) as the core. However, there are problems with the traditional design. For example, the software or firmware used in the DSP is written in assembly language, which is very cumbersome to develop (e.g., longer time to code, debug, etc.). A long erroneous and inefficient development cycle is resulted. Another problem is that DSP is not meant for control general computation, and DSP requires a large on-chip memory to store its code and data. Another issue in traditional architecture is that each functional block within the SoC accesses the memory via its own direct memory access (DMA) logics using a shared bus (e.g. AMBA). As a result, the logic usage is inefficient because dedicated DMA buffers and logics are required for each of the functional blocks. In addition, the conventional data bus is limited to an one-way data traffic, thereby the data throughout over the conventional data bus becomes a bottleneck of the traditional SoC.

Therefore, there is a need for a new improved architecture in a SoC designed for voice and video IP application to solve the aforementioned problems.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses an integrated circuit such as system-on-chip (SoC) for voice and video over data network (e.g., Internet, LAN, WAN) applications. According to one aspect, the SoC includes a first and a second general purpose processors (e.g., MIPS® or ARM® processor core) and a plurality of coprocessors. The first and the second processors may be identical to form a symmetrical dual processing system, or they may be of different types but providing equivalent central processing capabilities. The coprocessors include the following function blocks: a VCODEC engine for video compression/decompression, a security engine (SE) for data encryption/decryption, a network processor (NP) for processing data packets, a video scaling controller (VSC) for scaling up/down video frames, and a first and a second digital signal coprocessors (DSP-COP) for signal processing and audio codec. The first and the second DSP-COP couples to the first and the second processors, respectively. An on-chip shared memory (e.g., SRAM) is coupled to and accessed by both of the processors and some of the coprocessors (e.g., DSP-COP, VSC, NP and SE). An off-chip memory (e.g., SDRAM) is accessed by both of the processors and by the VCODEC engine via a memory controller (MC).

According to another aspect, the processors, coprocessors and peripheral logic of the SoC are designed without dedicated memory. The on-chip shared memory of the SoC enables both of the processors and the plurality of coprocessors an efficient memory usage including, but not limit to, processor cache, stream buffers, scratch memory for the processors, cache for the NP, line buffer for the VSC, buffer for the SE, and loop buffer for the DSP-COP. The buffers and scratch memory are configurable and reconfigurable in accordance with application requirements defined by users. According to yet another aspect, the SoC includes a stream controller (SC) and a transaction management engine (TME). The SC controls various properties of a stream buffer of the shared memory in accordance with a context defined by a user. The TME manages the functional data flow in accordance with one or more task queues created and stored on the off-chip memory by either of the processors. The queues are processed according to a priority for controlling the order of task executions in different queues for QoS control purposes.

According to still another aspect, the SoC includes a plurality of peripheral controllers coupling to a stream bus. Other function blocks coupling to the stream bus are the shared memory, stream controller, TME and coprocessors. The stream bus is capable of concurrent bi-directional data transfer between any of the coupled function blocks and the share memory. In accordance with one embodiment, the present invention is a integrated circuit for voice and video over data network applications, the circuit includes at least the following: a first and a second processors; a plurality of coprocessors coupled to the processors; a shared memory coupled to the processors and the coprocessors; a memory controller coupled to the processors for accessing data stored on an off-chip memory; and a transaction management engine (TME) coupling to the shared memory and to the memory controller, wherein the TME manages at least one transaction in accordance with at least one task queue, respectively. In another embodiment, the circuit further includes at least the following: a bi-direction stream bus coupled to the shared memory; a plurality of peripheral controllers coupled to the stream bus; and a stream controller coupled to the memory controller, the shared memory and the stream bus, wherein the stream controller controls the at least one stream transaction.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 2 is a diagram showing an exemplary memory allocation of an on-chip shared memory configured to facilitate various buffers in accordance with one embodiment of the present invention;

FIGS. 4A and 4B are collectively a table showing the format of an exemplary task queue for the transaction management engine (TME) in accordance with one embodiment of the present invention; and FIG. 5 is a table showing the format of an exemplary context for the stream controller in accordance with one embodiment of the present invention.

DETAILED DESCRIPTIONS

Before undertaking the DETAILED DESCRIPTIONS below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this document, those of ordinary skill in the art should understand that in many, if not most instances, such definitions apply to prior, as well as future uses of such defined words and phrases.

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the present invention are discussed herein with reference to FIGS. 1-5. However, those skilled in the art will readily appreciate that the detailed description given herein with respect to these figures is for explanatory purposes as the invention extends beyond these limited embodiments.

Figure 1:
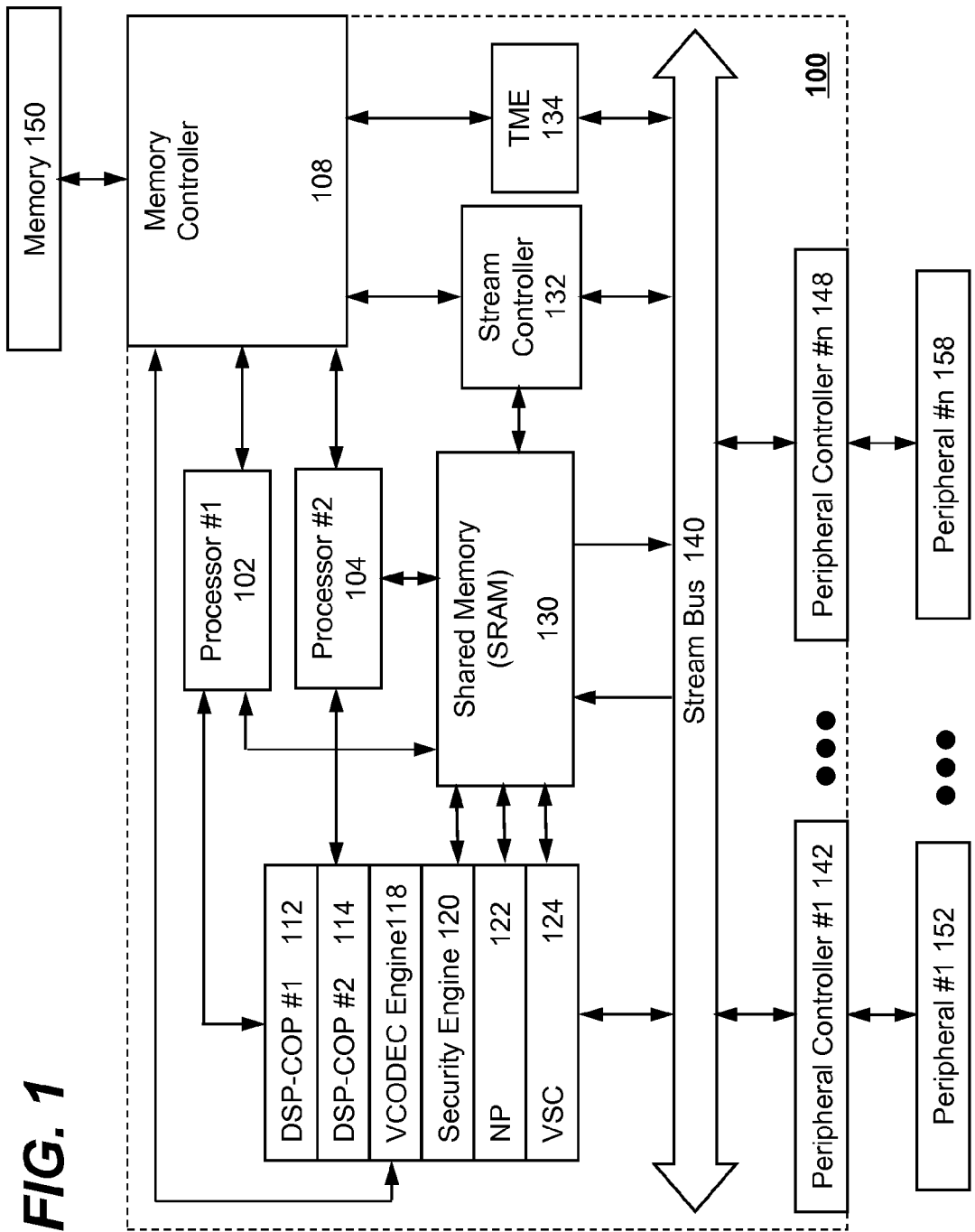
FIG. 1 is a diagram showing an exemplary system-on-chip (SoC) with an off-chip memory and a plurality of peripherals in accordance with one embodiment of the present invention.

Referring now to the drawings, FIG. 1 is a diagram showing an exemplary system-on-chip (SoC) 100 with an off-chip memory 150 and a plurality of peripherals 152, . . . , 158 in accordance with one embodiment of the present invention. An integrated circuit package, SoC 100, includes at least the following function blocks: a first 102 and a second 104 processors or processor cores, a first DSP-COP 112, a second DSP-COP 114, a video codec (VCODEC) engine 118, a security engine 120, a network processor (NP) 122, a video scaling controller (VSC) 124, an on-chip shared memory 130, a memory controller (MC) 108, a stream controller (SC) 132, a transaction management engine (TME) 134, a stream bus 140 and a plurality of peripheral controllers 142, . . . , 148. The first 102 and the second 104 processor are general purpose processors such as MIPS or ARM. In one embodiment, the first 102 and the second processors 104 are identical to form a symmetrical dual processing system. In another embodiment, the first 102 and the second processors 104 are of different types but providing equivalent capabilities. The processors 102 and 104 access data stored on the off-chip memory 150 via MC 108 and access the on-chip shared memory 130 directly. The off-chip memory (RAM) 150 is generally made up from slower speed memory such as dynamic random access memory (DRAM) or synchronous DRAM (SDRAM), while the on-chip shared memory 130 is made up from fast speed memory such as static random access memory (SRAM). The first 112 and second DSP-COP 114, VCODEC engine 118, security engine 120, NP 122 and VSC 124 are collectively referred to as a plurality of coprocessors, which couples to the first 102 and the second processors 104. The coprocessors are made up with function blocks of logics without any dedicated memory or direct memory access (DMA) logics. The first 112 and the second DSP-COP 114 are designed for performing signal processing and audio codec. The VCODEC engine 118 is for video compression and decompression based on one or more MPEG/H.26x standards (e.g., MPEG2, MPEG4, H.263, H.264 etc.). The security engine 120 is for data packet encryption, decryption, and authentication. The network processor 122 is for processing network packets so that the data packets can be routed efficiently. The VSC 124 is for scaling video frame size up and down. All of the coprocessors except the VCODEC engine access the shared memory 130 directly. The VCODEC engine 118 accesses the off-chip memory 150 via MC 108. Various memory buffers for the coprocessors and scratch memory between the processors are provided by the shared memory 130, which is configurable and reconfigurable as required. An exemplary configuration of the shared memory 130 is described in the description in reference to FIG. 2 below.

In this document, a transaction is referred to data movement from one place (i.e., source) to another place (i.e., destination), internal or external of the SoC 100. A stream is referred to as data flow through the stream controller 132. A stream transaction is a transaction that goes through the stream controller 132, the stream bus 140 and the stream buffer. TME 134 handles both stream transactions (by indirect task and direct task) and other transactions (by direct, immediate and extended tasks).

In one embodiment, the source and the destination are a location in the off-chip memory 150 and a location in the shared memory 130, respectively. In another embodiment, the source and the destination are a first and a second respective location in the shared memory 130. For example, the stream may start from a frame buffer in the off-chip memory 150 to the line buffer of the VSC 124, or from a line buffer of the VSC 124 to video out (Vout) controller.

The stream controller 132 controls major on-chip data flow traffics (e.g., video, audio, network data packets) in the SoC 100. The stream controller 132 allows flexible setup of various properties of a stream buffer in the shared memory 130 in accordance with data bandwidth and priority. The various properties are defined in accordance with a user defined context. The definition of an exemplary context is listed in FIG. 5. An exemplary stream buffer along with the properties is described below in FIG. 3. TME 134 manages transactions in accordance with at least one task queue stored on the off-chip memory 150. Each of the task queues may contain one or more sub-queues, which are executed according to a priority programmed by the processors. The definition of an exemplary task queue is listed in FIGS. 4A and 4B. Both the stream controller 132 and TME 134 are coupled to the memory controller 108 for accessing data on the off-chip memory 150, and coupled to the stream bus 140 for accessing the shared memory 130. Memory controller 108 accepts off-chip memory 150 data access requests from the processors 102 and 104, SC 132, TME 134 and other conventional DMA devices such as VCODEC engine 118. The requests have two types—indirect type and direct type. Indirect type requires a use of the off-chip memory context (stored in MC 108) by specifying the context ID in the request signals where the off-chip memory pointers are programmed in the off-chip memory context. An example of indirect request is the TME task queue request where TME 134 sends the off-chip memory context (queue) ID along with other request signals. Another example of indirect request is the requests from SC 132, where SC 132 only sends the off-chip memory context ID for the stream. Direct type requires the actual off-chip memory address in the request signals. An example of direct request is the process cache miss request to fetch a cache line. Data paths to memory controller 108 and to the stream bus 140 are separated to ensure that an independent data flow to the off-chip memory 150 for read and write. The stream bus 140 is a bi-directional data bus (i.e., independent read and write bus) that doubles the data throughput from the conventional data bus (e.g., AMBA). In one embodiment, the stream controller 132 can deliver up to 800M bytes of data traffics at full duplex via a 100 MHz 32-bit wide stream bus 140. The plurality of peripheral controllers 142, . . . , 148 are coupled to the stream bus 140, so that the respective peripherals 152, . . . , 158 can access the data in the share memory 130 efficiently. The peripherals may include, but not be limited to, Ethernet, video in/out, audio in/out, flash memory, and alike.

In a preferred embodiment, a SoC 100 is used in a video IP telephone set. The SoC 100 includes that a first 102 and a second 104 processors with 200 MHz MIPS 4Kec cores running Linux and Real Time Operating System (RTOS), respectively. And the SoC 100 includes a shared memory 130 of 20K bytes of SRAM plus processor cache memory (e.g., 16K bytes of instruction cache and 16K bytes of data cache for each processor). One exemplary implementation of this preferred embodiment is included in a SoC, VB2100, offered by VBridge MicroSystem®, Inc.

FIG. 2 is a diagram 200 showing an exemplary memory allocation of an on-chip shared memory configured to facilitate various buffers in accordance with one embodiment of the present invention. The on-chip share memory 130 of FIG. 1 is shared by the first and second processors and the coprocessors through various memory buffers, caches. These buffers and caches are allocated and configured in accordance with the requirements of the application. The diagram 200, which is preferably understood in conjunction with FIG. 1, shows an exemplary memory allocation as follows: i) processor #1 cache 201; ii) processor #2 cache 202, iii) scratch memory 203 for the first 102 and second processors 104; iv) line buffer 204 for the VSC 124; v) instruction cache (Icache) 206 for the NP 122; vi) pattern match table cache (TBLcache) 208 for the NP 122; vii) buffer 210 for the security engine 120; viii) loop buffer 212 for the first 112 and second DSP-COP 114; and ix) stream buffers 214 for the stream controller 132. It is note that the shared memory is reconfigurable based on the requirements of the application. In another embodiment, only certain of the above described buffers and caches are allocated. The memory space vacated from the non-allocated buffers or caches may be used by the certain allocated ones. In one embodiment, the size of the shared memory is 20 Kbytes (KB) including 5 banks of 4 KB of SRAM, plus processor caches (i.e., 16 KB of instruction and 16 KB of data cache for each processor).

Figure 3:
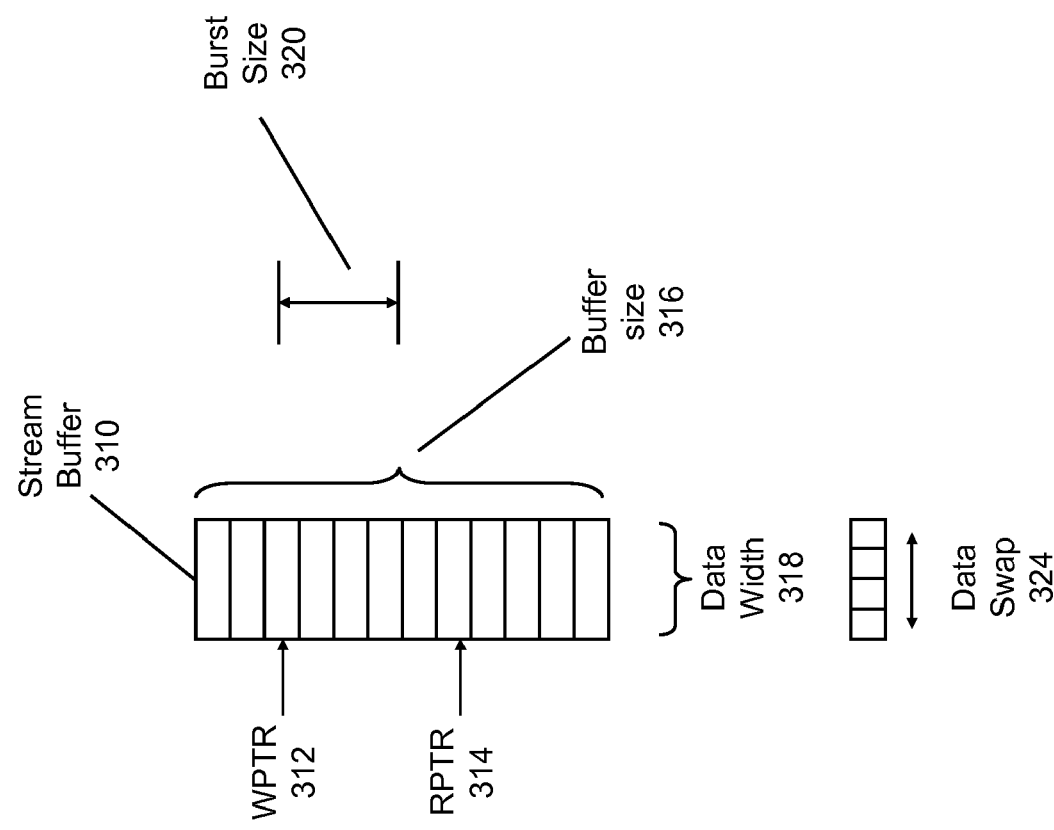
FIG. 3 is a diagram illustrating various properties of an exemplary stream buffer in accordance with one embodiment of the present invention.

FIG. 3 is a diagram 300 illustrating various properties of an exemplary stream buffer 310 in accordance with one embodiment of the present invention. The stream buffer 310 is created by the stream controller 132 of FIG. 1 and set up in the shared memory 130. The properties of the stream buffer 310 include a writer pointer 312, a read pointer 314, a buffer size 316, a data width 318, a burst size 320 and data swap 324. In one embodiment, the buffer size is set to 512 bytes. In another embodiment, the data width may be 1-, 2-, or 4-byte. In yet another embodiment, a 4-byte data may be stored in either big endian or little endian, the data swap 324 option is set accordingly ensuring the proper order of the bytes is processed. These properties can be reconfigured dynamically based on the data type and the data network traffic loads.

FIGS. 4A and 4B are collectively a table 400 showing the format of an exemplary task queue for the transaction management engine (TME) in accordance with one embodiment of the present invention. Table 400 contains four columns: word #401, name 402, bits 404 and descriptions 406. The exemplary task queue requires two 32-bit words to specify. The contents of the first word of the queue, word #0, are listed in FIG. 4A, while the contents of word #1 are in FIG. 4B. TME 134 of FIG. 1 reads the instructions in the queue and executes the transaction. The queues are created by the processors 102 and 104, and stored on the off-chip memory 150. One of the queues may have higher priority than another, so that quality of service (QoS) control can be implemented for certain applications. TME 134 can execute more than one queue in parallel or concurrently. In one embodiment, TME 134 is configured to facilitate 16 task queues with each having 1 to 8 sub-queues. The sub-queues may be executed according to priority for QoS purpose. Within a task queue, there are four different types of task: i) indirect type that sets up a stream transaction via the stream controller; ii) direct type that transfers data between one direct address (i.e., a global address that maps to either on-chip register or off-chip memory) and one stream; iii) immediate type that writes immediate data (i.e., data included in the immediately followed task in the task queue) to a direct address; and iv) extended type that transfers data between two direct addresses. The 4 types of task may be mixed in any one of the task queues.

FIG. 5 is a table 500 showing the format of an exemplary context for the stream controller (e.g., stream controller 132 of FIG. 1) in accordance with one embodiment of the present invention. Various properties of the stream buffer (e.g., stream buffer 310 of FIG. 3) are defined in the respective rows in the table 500. Table 500, which is preferably understood in conjunction with FIG. 3, has three columns: name 502, bits 504 and descriptions 506. The context is defined by users based on the requirements of a specific data stream. In this exemplary context, the properties are defined as follows: 1) BUF_USE in bit 0 to designate an internal on-chip data stream or a data stream requiring access of data on the off-chip memory; 2) DB_SIZE in bit 1 to specify the width of data 318; 3) SIZE in bits 2-4 to specify the buffer size 316; 4) MB_SIZE in bits 7-8 to specify the burst length 320; 5) SWAP in bits 9-10 to specify the order of incoming data; 6) RPTR 312 in bits 11-19 to specify the read address; and 7) WPTR 314 in bits 23-31 to specify the writer address.

The present invention can be implemented in many ways, each of which may yield one or more of the following benefits, advantages or features. One of them is to reduce the cost of the integrated circuit package while maintain high performance in both data bandwidth and processing power. Second is to ease the effort of software development. Third is to flexibly adapt to different applications that requires different peripheral bandwidth and processor functions. Other benefits, advantages or features can be appreciated by those skilled in the art given the detailed description herein.

Although exemplary embodiments of present invention have been disclosed, it will be apparent to those skilled in the art that various changes and modifications may be made to achieve the advantage of the invention. It will be obvious to those skilled in the art that some components may be substituted with another component providing same function. The appended claims cover the present invention.

What is claimed is:

1. An integrated circuit for voice and video over data network applications, the circuit comprising:
   a first and a second processors;
   a plurality of coprocessors coupled to the processors, the plurality of coprocessors includes, at least first and second digital signal processing coprocessors (DSP-COP), a VCODEC engine, a security engine, a network processor (NP) and a video scaling controller (VSC), wherein the first and second DSP-COP perform signal processing and audio codec, the VCODEC engine compresses and decompresses video frames, the security engine encrypts and decrypts data packets, the NP parses data packets to accelerate routing of the data packets and the VSC scales up and down size of video frames;
   a shared memory coupled to the processors and the coprocessors;
   a memory controller coupled to the processors for accessing data stored on an off-chip memory; and
   a transaction management engine (TME) coupling to the shared memory and to the memory controller, wherein the TME manages at least one transaction in accordance with at least one task queue, respectively.

2. The circuit of claim 1, wherein the first and the second processors are identical general purpose processors to form a symmetric processing system.

3. The circuit of claim 2, wherein the first processor is a MIPS core running Linux operating system and the second processor is a MIPS core running real time operating system.

4. The circuit of claim 1, wherein the first processor handles user interfaces and the second processor handles real time data packet traffic.

5. The circuit of claim 1, wherein the shared memory is configurable and reconfigurable in accordance with requirements of the application.

6. The circuit of claim 5, wherein the shared memory is configured to facilitate at least one or more of the following: i) loop buffer for the first and the second DSP-COP; ii) caches for the NP; iii) line buffer for the VSC; iv) buffer for the security engine; v) scratch memory for the processors; vi) stream buffers, and vii) processor caches.

7. The circuit of claim 1, wherein the VCODEC engine is coupled to the memory controller.

8. The circuit of claim 1, wherein the shared memory is made up from static random access memory.

9. The circuit of claim 1, wherein the TME performs the at least one transaction concurrently.

10. The circuit of claim 9, wherein the at least one transaction is between a location of the shared memory and a location of an off-chip memory.

11. The circuit of claim 9, wherein the at least one transaction is between a first location of the shared memory and a second location of the shared memory.

12. The circuit of claim 1, wherein the at least one task queue is set up by the processors and stored on the off-chip memory.

13. The circuit of claim 12, wherein one of the at least one task queue includes one or more sub-queues.

14. The circuit of claim 13, wherein one of the sub-queues has a higher priority than another of the sub-queues.

15. The circuit of claim 13, wherein the TME executes the sub-queues in accordance with the priority.

16. The circuit of claim 1, further comprising:
   a stream bus coupled to the shared memory;
   a plurality of peripheral controllers coupled to the stream bus; and
   a stream controller coupled to the memory controller, the shared memory and the stream bus; wherein the stream controller controls the at least one stream transaction.

17. The circuit of claim 16, wherein the stream bus is a bi-directional independent read and write data bus that can transmit data concurrently.

18. The circuit of claim 16, wherein the stream bus configures data structure of a stream buffer in the shared memory in accordance with a context defined by users.

19. The circuit of claim 18, wherein the data structure includes a buffer size, a data width, a burst size, a data swap option, a buffer read pointer and a buffer write pointer.

20. The circuit of claim 19, wherein the data swap option allows data stored in either big endian or little endian.

21. The circuit of claim 18, wherein the at least one stream transaction flows through the stream bus and the stream buffer.

22. The circuit of claim 16, wherein the plurality of peripheral controllers accesses a plurality of respective peripherals including, but not limit to, Ethernet, video in/out, audio in/out, flash memory.

23. The circuit of claim 1, wherein the at least one transaction includes four different types of operation: indirect, direct, immediate and extended.

24. The circuit of claim 23, wherein any one of the task queues includes at least one of the four types of operation.

* * * * *